United States Patent
Coldwate et al.

(10) Patent No.: US 10,855,131 B2
(45) Date of Patent: Dec. 1, 2020

(54) POTTING AND INSULATION SYSTEM FOR A CONCENTRATED COIL SOIL STATOR

(71) Applicant: Hamilton Sundstrand Corporation, Charlotte, NC (US)

(72) Inventors: Joseph Kenneth Coldwate, Roscoe, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/362,018

(22) Filed: Mar. 22, 2019

(65) Prior Publication Data
US 2020/0303984 A1 Sep. 24, 2020

(51) Int. Cl.
*H02K 3/46* (2006.01)
*H02K 3/32* (2006.01)
*H02K 3/18* (2006.01)
*H02K 11/25* (2016.01)
*H02K 1/14* (2006.01)
*H02K 15/10* (2006.01)

(52) U.S. Cl.
CPC ............. *H02K 3/325* (2013.01); *H02K 1/146* (2013.01); *H02K 3/18* (2013.01); *H02K 11/25* (2016.01); *H02K 15/105* (2013.01)

(58) Field of Classification Search
CPC ............. H02K 3/46; H02K 3/48; H02K 3/521
See application file for complete search history.

(56) References Cited

U.S. PATENT DOCUMENTS

| 1,492,022 | A | * | 4/1924 | Eddy | H02K 11/25 310/68 C |
|---|---|---|---|---|---|
| 3,008,786 | A | * | 11/1961 | Costello | H02K 3/527 310/214 |
| 3,984,711 | A | * | 10/1976 | Kordik | H02K 37/20 310/49.46 |
| 5,498,916 | A | * | 3/1996 | Lindner | H02K 3/522 310/214 |

(Continued)

FOREIGN PATENT DOCUMENTS

| DE | 2708429 A1 | 9/1977 |
|---|---|---|
| DE | 102016213866 A1 | 2/2018 |

(Continued)

OTHER PUBLICATIONS

Extended European Search Report dated Jun. 16, 2020, issued during the prosecution of European Patent Application No. EP 19210415.6.

*Primary Examiner* — Dang D Le
(74) *Attorney, Agent, or Firm* — Locke Lord LLP; Scott D. Wofsy; Georgi Korobanov

(57) ABSTRACT

An assembly for an electric machine including a core with a plurality of teeth extending radially inward from the core, the plurality of teeth defining a plurality of slots for receiving coils, a plurality of coils, each coil wrapping around a respective tooth, a separator in one of the slots including a first leg joined at an angle to a second leg for separating adjacent coils within the slot, an insert between the first leg and the second leg for at least partially filling a space between the first leg and the second leg, and a potting filling space within the slot between the separator, the plurality of coils, and the insert.

17 Claims, 3 Drawing Sheets

(56) References Cited

U.S. PATENT DOCUMENTS

| | | | | |
|---|---|---|---|---|
| 6,225,723 | B1* | 5/2001 | Cooper | H02K 1/24 |
| | | | | 310/214 |
| 7,986,070 | B2* | 7/2011 | Baudelocque | F16C 32/047 |
| | | | | 310/214 |
| 8,946,970 | B2* | 2/2015 | Knapp | H02K 3/48 |
| | | | | 310/214 |
| 2003/0184180 | A1* | 10/2003 | Doherty | H02K 3/527 |
| | | | | 310/214 |
| 2013/0193781 | A1 | 8/2013 | Rasmussen et al. | |
| 2014/0117805 | A1 | 5/2014 | Hagiwara et al. | |
| 2014/0175936 | A1 | 6/2014 | Coldwate et al. | |

FOREIGN PATENT DOCUMENTS

| | | |
|---|---|---|
| JP | S62193523 A | 8/1987 |
| JP | 2006217679 A | 8/2006 |
| JP | 2011130566 A | 6/2011 |
| WO | WO-2018088115 A1 | 5/2018 |

\* cited by examiner

1

POTTING AND INSULATION SYSTEM FOR A CONCENTRATED COIL SOIL STATOR

BACKGROUND

Technological Field

The present disclosure relates to coil windings, and more particularly to insulating coil windings.

Description of Related Art

A variety of devices are known for insulating motor windings. Motor stators and rotors with concentrated windings that are potted are sometimes subject to eventual cracking of the epoxy material used for potting, especially after thermal cycling. This cracking can lead to eventual damage to the motor windings or thermal sensors that are installed in the stator/rotors slots. This damage makes the motors inoperable and leads to field returns.

The conventional methods and systems have generally been considered satisfactory for their intended purpose. However, there is still a need in the art for insulation having improved reliability and resilience. There also remains a need in the art for such insulation that is economically viable. The present disclosure may provide a solution for at least one of these remaining challenges.

SUMMARY OF THE INVENTION

An assembly for an electric machine, such as a rotor or stator, includes a core with a plurality of teeth extending radially inward from the core, the plurality of teeth defines a plurality of slots for receiving coils, a plurality of coils, each coil wrapping around a respective tooth, a separator in one of the slots including a first leg joined at an angle to a second leg for separating adjacent coils within the slot, an insert between the first leg and the second leg for at least partially filling a space between the first leg and the second leg, and a potting filling space within the slot between the separator, the plurality of coils, and the insert.

The separator can be "V" shaped with the first leg and the second leg each contacting a wall of the slot. The separator can electrically isolating. The first leg can be connected to a second leg of an adjacent separator by a cord. A first side of the first leg can contact the coils and a second side of the first leg can contact the insert.

The insert can be deformable, can include aramid felt, and can assume a shape of the space. A thermal sensor can be placed within the insert. A liner can cover at least a portion of a wall of the slot, or of each slot.

The potting can include epoxy. The separator and the insert can absorb a portion of the potting.

A method for insulating windings is also contemplated. The method includes placing a separator including a first leg joined at an angle to a second leg in a slot between adjacent teeth and adjacent coils forming a space between the legs of the separator and a wall of the stator, inserting an insert into the space, and potting the coils, the separator, and the insert. The first leg can be connected to a second leg of an adjacent separator by a cord. Epoxy can be used for potting. The separator and the insert can be saturated with epoxy.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
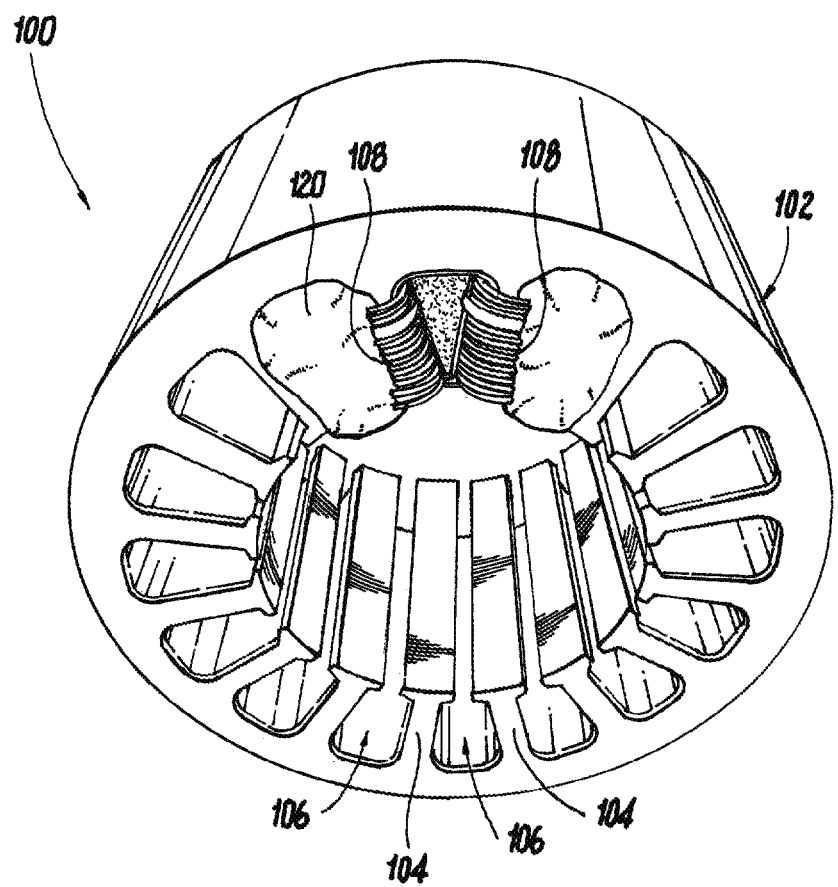
FIG. 1 is a perspective view of an electric machine in accordance with the disclosure.
Figure 2:
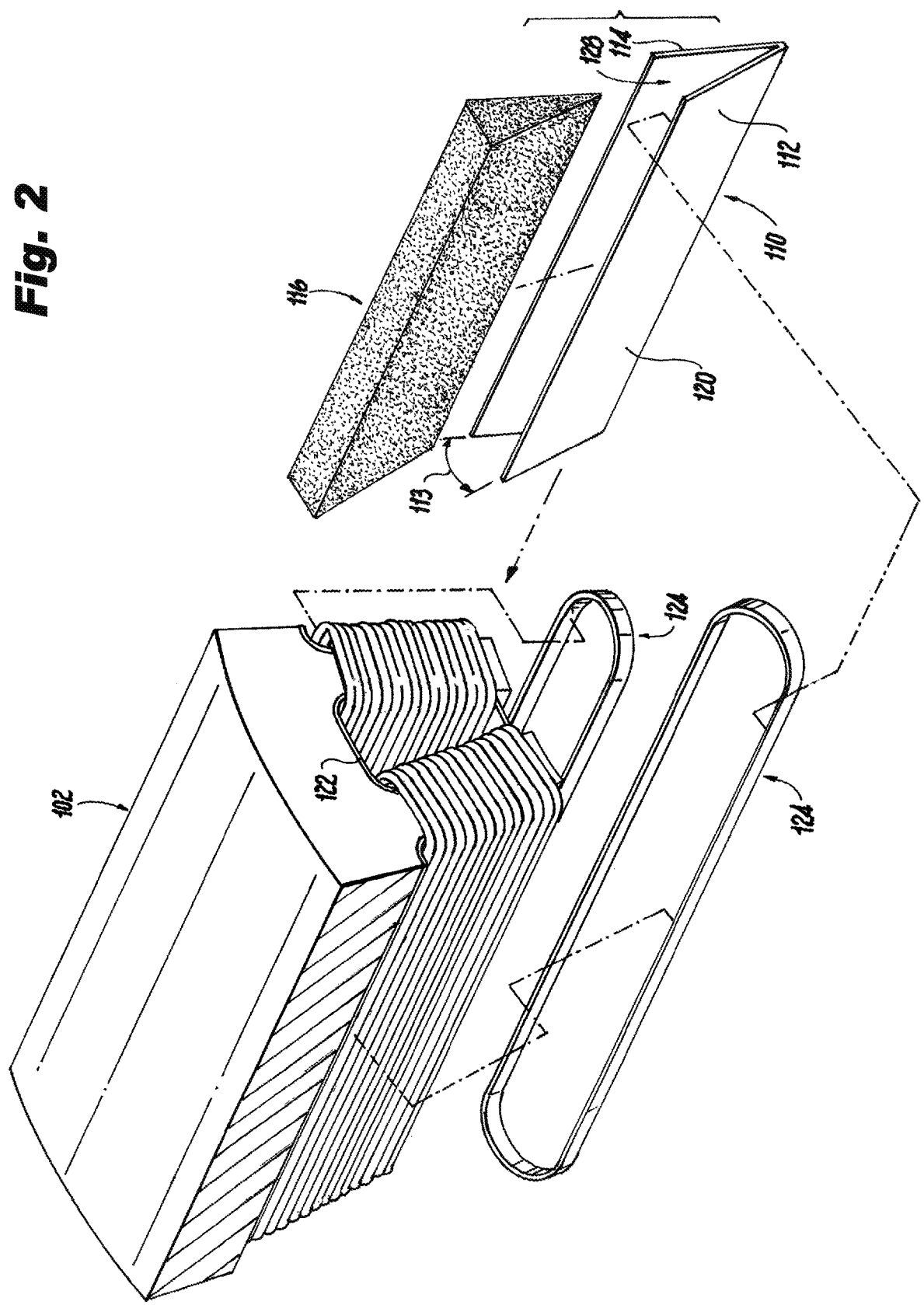
FIG. 2 is an exploded view of FIG. 1, showing the inserts and separators separate from the electric machine.
Figure 3A:
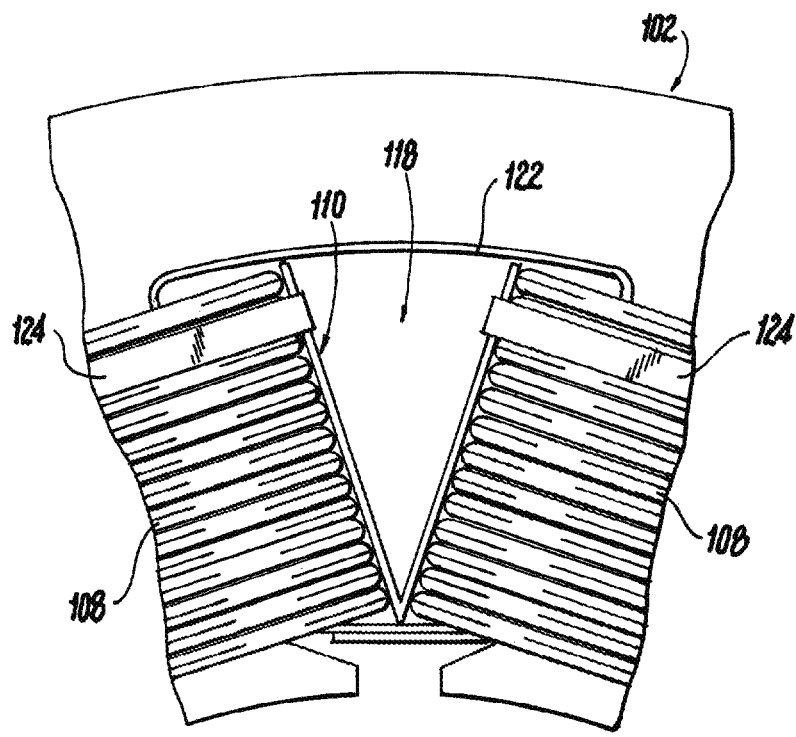
FIG. 3*a* is an enlarged view of a slot of FIG. 1, showing a single slot without the insert.
Figure 3B:
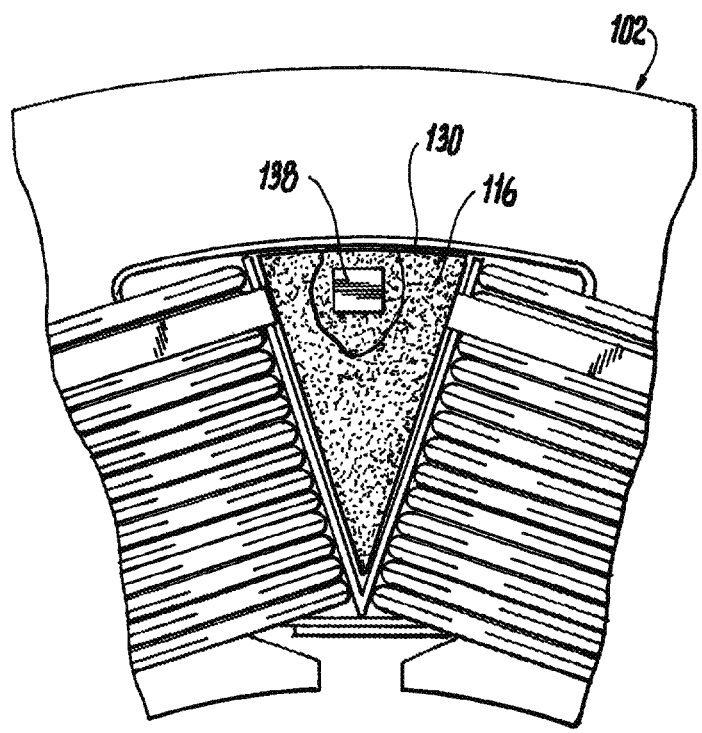
FIG. 3*b* is an enlarged view of a slot of FIG. 1, showing the slot with the insert.

Reference will now be made to the drawings wherein like reference numerals identify similar structural features or aspects of the subject invention. For purposes of explanation and illustration, and not limitation, a partial view of an exemplary embodiment of an electrical machine in accordance with the invention is shown in FIG. 1 and is designated generally by reference character 100. Other aspects of electrical machine in accordance with the invention, or are provided in FIGS. 2-3*b*, as will be described. The methods and systems of the invention can be used to improving insulation and sensor reliability.

Referring now to FIGS. 1-3*b*, an assembly for an electric machine 100 includes a core 102 with a plurality of teeth 104 extending radially outward from the core 102, the plurality of teeth 104 defines a plurality of slots 106 for receiving coils 108. In this instance the electric machine 100 is shown as a stator, but the electric machine 100 can also be a rotor. Each coil 108 wraps around a respective tooth 104. A separator 110 located in one of the slots 106 includes a first leg 112 joined at an angle 113 to a second leg 114 for separating adjacent coils 108 within the slot 106. An insert 116 located between the first leg 112 and the second leg 114 for at least partially filling a space 118 between the first leg 112 and the second leg 114, and a potting 120 filling space within the slot 106 between the separator 110, the plurality of coils 108, and the insert 116. The potting 120 can include epoxy. The separator 110 and the insert 116 can absorb a portion of the potting 120. A first side 126 of the first 112 leg can contact the coils 108 and a second side 128 of the first leg 112 can contact the insert 116.

Further referencing FIG. 1, the separator 110 can be "V" shaped, with the first leg 112 and the second leg 114 each contacting a wall 122 of the slot 106. The ends of the legs 112, 114 can be arcuately shaped in order to better abut the curved wall of 122. The separator 110 includes an electrically isolating material. The first leg 112 can be connected to a second leg 114 of an adjacent separator 110 by a cord 124. The cord 124 can be wound around each of the legs to draw them closer to each other and to help maintain the space 118.

The insert 116 can be deformable. The insert 116 can include aramid felt, or similar material. The insert 116 can expand or be squeezed to assume a shape of the space 118. A thermal sensor 138 can be placed within the insert 116. A liner 130 can also cover at least a portion of the wall 122 of the slot 106.

A method for insulating coils 108 is also contemplated. A separator 110 including a first leg 112 joined at an angle 113 to a second leg 114 is placed in a slot 106 between adjacent teeth 104 and adjacent coils 108 forming a space 118 between the legs 112, 114 of the separator 110 and a wall 122 of the electrical machine 100. The separator 110 can be squeezed during installation in order to make the separator narrower, the separator 110 would widen after being released and contact the coils 108 on either side. The first leg 112 can be connected to a second leg 114 of an adjacent separator 110 by a cord, that is wrapped around both legs 112, 114 and around the tooth 104 located between the legs 112, 114. The cord helps affix the legs 112, 114. An insert 116 can be placed into the space 118. The insert 116 can be deformed or squeezed during installation. The insert will subsequently expand and fill the space, at least partially, into which it was placed. The coils 108, the separator 110, the insert 116, the space 118, and any gaps between the aforementioned components are potted. Epoxy can be used for potting. The separator and the insert are at least partially saturated with epoxy.

What is claimed is:

1. An assembly for an electric machine comprising:
   a core having a plurality of teeth extending radially inward from the core, the plurality of teeth defining a plurality of slots for receiving coils;
   a plurality of coils, each coil wrapping around a respective tooth;
   a separator in one of the slots including a first leg joined at an angle to a second leg for separating adjacent coils within the slot, wherein the first leg is connected to a second leg of an adjacent separator by a cord;
   an insert between the first leg and the second leg for at least partially filling a space between the first leg and the second leg; and
   a potting filling space within the slot between the separator, the plurality of coils, and the insert.

2. The system of claim 1, wherein the separator is "V" shaped.

3. The system of claim 1, wherein the first leg and the second leg each contact a wall of the slot.

4. The method of claim 1, wherein the separator is electrically isolating.

5. The system of claim 1, wherein the insert is deformable.

6. The system of claim 1, wherein the insert includes aramid felt.

7. The system of claim 1, wherein the insert assumes a shape of the space.

8. The system of claim 1, wherein the insert includes a thermal sensor.

9. The system of claim 1, wherein the potting includes epoxy.

10. The system of claim 1, wherein the separator and the insert absorb a portion of the potting.

11. The system of claim 1, wherein a first side of the first leg contacts the coils and a second side of the first leg contacts the insert.

12. The system of claim 1, wherein a liner covers a wall of the slot.

13. The system of claim 1, wherein each of the plurality of slots includes a separator, an insert, and a potting.

14. An assembly for an electric machine comprising:
    a core having a plurality of teeth extending radially inward from the core, the plurality of teeth defining a plurality of slots for receiving coils;
    a plurality of coils, each coil wrapping around a tooth;
    a deformable "V" shaped separator including a first leg joined at an angle to a second leg for separating adjacent coils;
    a deformable insert between the first leg and the second leg for expanding a space between the first leg and the second leg, wherein the first leg is connected to a second leg of an adjacent separator by a cord;
    a thermal sensor located within the deformable insert; and
    an epoxy potting covering the plurality of coils, and being absorbed by the deformable "V" shaped separator and the deformable insert.

15. A method for insulating coils comprising:
    placing a separator including a first leg joined at an angle to a second leg in a slot between adjacent teeth and adjacent coils forming a space between the legs of the separator and a wall of an electric machine;
    inserting an insert into the space;
    potting the coils, the separator, and the insert and
    connecting the first leg to a second leg of an adjacent separator by a cord.

16. The method of claim 15, wherein epoxy is used for potting.

17. The method of claim 16, wherein the separator and the insert are saturated with epoxy.

* * * * *